United States Patent [19]

Ishikawa et al.

[11] Patent Number: 5,662,766

[45] Date of Patent: Sep. 2, 1997

[54] TOOL HORN CONVERTING LONGITUDINAL VIBRATION TO TORSIONAL VIBRATION

[75] Inventors: Takehisa Ishikawa; Tomio Maruzoe; Yoshiaki Nagata, all of Atsugi, Japan

[73] Assignee: Taiji Mishima, Atsugi, Japan

[21] Appl. No.: 347,316

[22] PCT Filed: Mar. 31, 1994

[86] PCT No.: PCT/JP94/00533

§ 371 Date: Nov. 30, 1994

§ 102(e) Date: Nov. 30, 1994

[87] PCT Pub. No.: WO94/23935

PCT Pub. Date: Oct. 27, 1994

[30] Foreign Application Priority Data

Apr. 8, 1993 [JP] Japan ...................... 5-104896

[51] Int. Cl.$^6$ .................................. B29C 65/08
[52] U.S. Cl. .................. 156/580.2; 156/580.1; 310/333; 425/174.2
[58] Field of Search ................ 156/73.1, 580.1, 156/580.2; 264/23, 442, 444, 445; 425/174.2; 310/323, 325, 328, 333

[56] References Cited

U.S. PATENT DOCUMENTS

| | | | |
|---|---|---|---|
| 4,642,509 | 2/1987 | Kumada | 310/323 |
| 4,697,117 | 9/1987 | Mishiro | 310/323 |
| 4,703,214 | 10/1987 | Mishiro | 310/328 |
| 4,705,980 | 11/1987 | Mishiro | 310/323 |
| 4,812,697 | 3/1989 | Mishiro | 310/323 |

FOREIGN PATENT DOCUMENTS

| | | |
|---|---|---|
| 62-92981 | 5/1987 | Japan . |
| 2-172577 | 7/1990 | Japan . |
| 4-33530 | 3/1992 | Japan . |
| 4-201236 | 7/1992 | Japan . |

OTHER PUBLICATIONS

Kyoryoku Cho–onpa Gitjutsu (High–power Ultrasonic Technique, published Sep. 30, 1987, pp. 370–376.

*Primary Examiner*—James Sells
*Attorney, Agent, or Firm*—Varndell Legal Group

[57] ABSTRACT

An object of the invention is to provide a tool horn integrally formed into one unit of a vibration converting portion (1) and a torsional vibration tool portion (2), which can convert longitudinal vibration in an ultrasonic processing device (DE) to torsional vibration, wherein said vibration converting portion (1) is provided with a disk-shaped main body (11), in which flexural vibrations are induced when ultrasonic vibrations concerned with longitudial direction are imparted thereto, with one side thereof forming one pair of projected frames (12) attachable to the longitudial vibration horn and the other side thereof forming a connecting rib (14) connected to the torsional vibration tool portion (2), said connecting rib (14) being disposed in a relation occupying the diagonal position to said projected frames (12).

5 Claims, 3 Drawing Sheets

TOOL HORN CONVERTING LONGITUDINAL VIBRATION TO TORSIONAL VIBRATION

TECHNICAL FIELD

The present invention relates to a tool horn which can subject thermoplastic materials, or the like, to ultrasonic processing treatment by converting ultrasonic vibration concerned with longitudinal direction to vibration concerned with torsional direction.

BACKGROUND ART

Heretofore, the techniques in which materials being processed are, for example, welded by causing the tool horns of this sort to excite ultrasonic vibrations concerned with longitudinal or torsional direction have already been widely utilized, and among them as the one causing the tool horn to generate torsional vibrations there is known the technique of Japanese Utility Model Registration Application (OPI) No. 33530/1992 (prior-known example 1).

The contents of this application are such that torsional vibrations are imparted to the input plane of the tool horn by means of a torsional vibrator and by making these torsional vibrations resonate with the frequency to be used so as to generate torsional vibrations on the radial plane of said tool horn, the materials being processed are subjected to ultrasonic processing.

Also, as the technique which utlizes the torsional vibration mode generated in an ultrasonic machine, or the like, there has been proposed that of Japanese Patent Application (OPI) No. 172577/1990 (prior-known example 2), whose contents are such that a plurality of groups of split-electrodes are juxtaposed to a piezo-electric ceramic ring, being combined in such a way that the electric force line has a definite angle of inclination against the direction of the thickness between two split-electrodes with each of them being constituted so as to facilitate the electric polarizing treatment and coupling treatment.

In addition to the above, as the technique which converts longitudinal vibrations imparted to torsional vibrations, for example, the technique concerning ultrasonic motors is shown in a Japanese book "Kyoryoku Cho-onpa Gijutsu (High-power Ultrasonic Technique)" (published Sep. 30, 1987) (conventional example).

The Contents of this book are as described on pages 370–371 of said book; that is to say, it is disclosed that as shown in FIG. 2 of said book ultrasonic vibrations concerned with longitudinal direction can be converted to torsional ultrasonic vibrations by making use of a torsional Coupler in such a way that while one said of a disk is concaved to provide a groove leaving one pair of crescent-shaped legs, the other side is protrusively provided with a beam situated in the diagonal position to said groove, so that when, supporting said disk by screwing up a bolt (not shown in the figure) into the tapped hole pierced in the central portion of said disk, longitudinal vibrations in the direction of the arrow X are applied to said crescent-shaped legs, flexural vibrations are generated in the disk, and the ridge-line of said beam tilts, and as the result torsional vibrations are generated on the upper surface of said beam.

Even in the techniques disclosed in the above-described prior-known examples 1 and 2 it is found that in the point of subjecting the materials being processed to ultrasonic machining treatment they are so original and inventive, respectively, that their objects can presumably be achieved, but in said prior-known example 1, since the input imparted is torsional vibrations it separately requires the means for generating torsional vibrations, and also in the prior-known example 2, it is indispensable for the generation of the torsional vibrations to employ a special technical means whose structure is complicated as described above, so that in either case, the scaling up and cost up of the aimed device were inevitable.

Further, the conventional example in the above-described book relates to no more than the torsional coupler per se for merely converting longitudinal vibration to torsional vibration, and therefore, from the side of the users it has been keenly hoped for that as the ultrasonic vibration tool horns there are provided those which are of a small size obtainable at low cost and can effeciently generate the power of torsional vibrations.

The object of the present invention is to provide a tool horn such that when it is only supplied with ultrasonic vibrations concerned with longitudinal direction it can serve as a compact tool horn which per se can generate power by converting said ultrasonic vibrations to torsional vibrations and when in actual use it can be readily fitted to the longitudial vibration device widely used for various purposes.

DISCLOSURE OF THE INVENTION

The characteristic features in the constitution of the present invention for achieving the above-described object are as follows.

1. The present invention is a tool horn for converting longitudial vibration to torsional vibration integrally formed into one unit of a vibration converting portion and a vibration tool portion, which is characterized in that said vibration converting portion is provided with a disk-shaped main body, in which flexural vibrations are induced when ultrasonic vibrations concerned with longitudial direction are imparted thereto, with one side thereof forming one pair of projected frames attached to said longitudial vibration horn and the other side thereof forming a connecting rib connectd to said torsional vibration tool portion, said connecting rib being disposed in a relation occupying the diagonal position to said projected frames.

2. The present invention is also a tool horn for converting longitudial vibration to tortional vibration as defined in the above-described (1), wherein said vibration converting portion is fitted to said longitudial vibration horn in a freely attachable and detachable manner.

In accordance with the present invention of the above-described constitution, by supplying the ultrasonic vibrations concerned with longitudinal direction to the torsional vibration horn from the longitudinal vibration horn, flexural vibrations are induced in the disk-shaped main body in the vibration converting portion, and as the result the longitudinal vibrations are smoothly converted to tortional vibrations, which are transmitted to the torsional vibration tool portion, rendering it possible to subject the materials, being processed to ultrasonic processing.

MOST PREFERRED EMBODIMENT OF THE INVENTION

Figure 1:
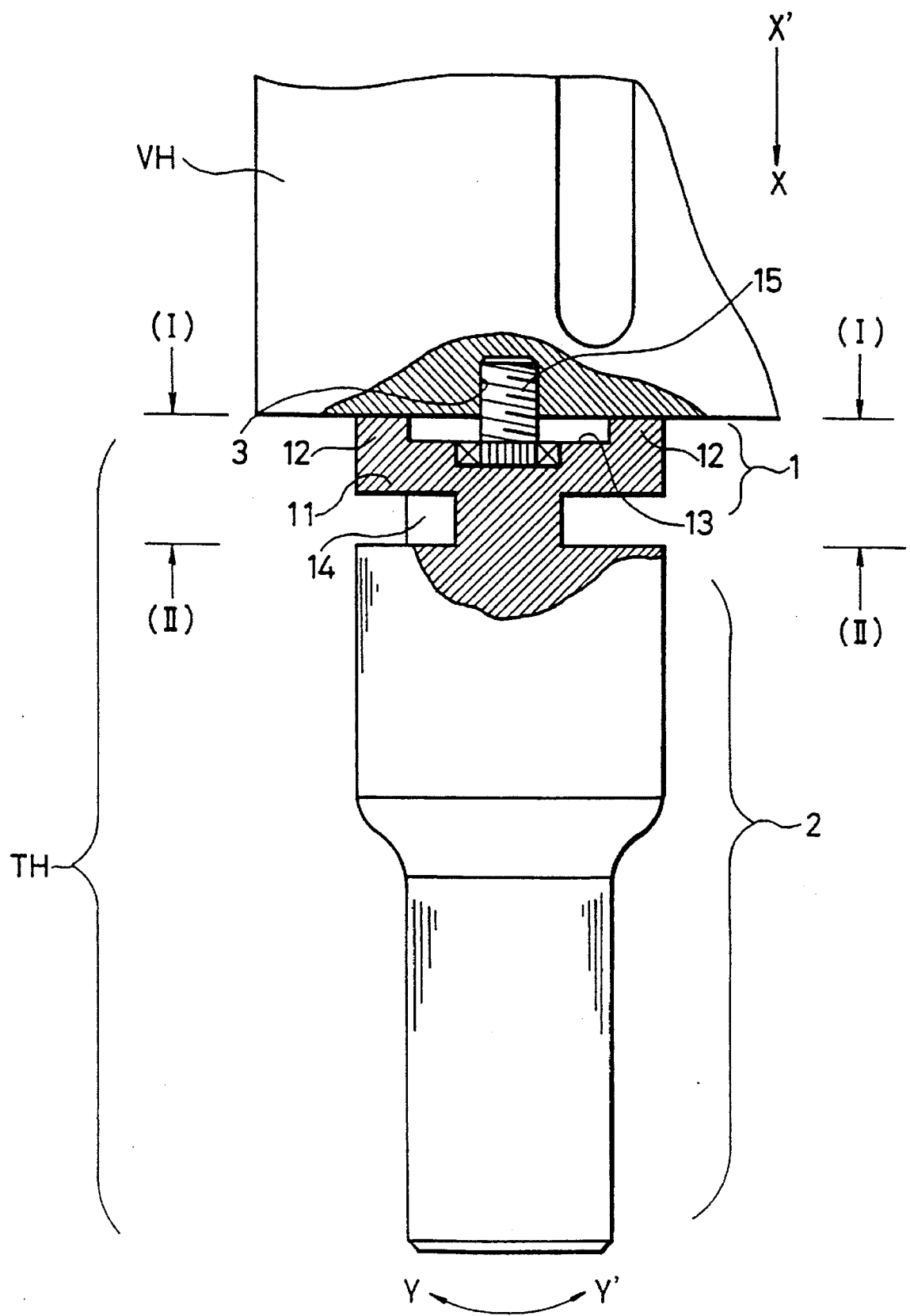
FIG. 1 is a side view showing the essential parts of the vibration tool in the present invention.

Next, with reference to the drawing the present invention will be explained.

Figure 3:
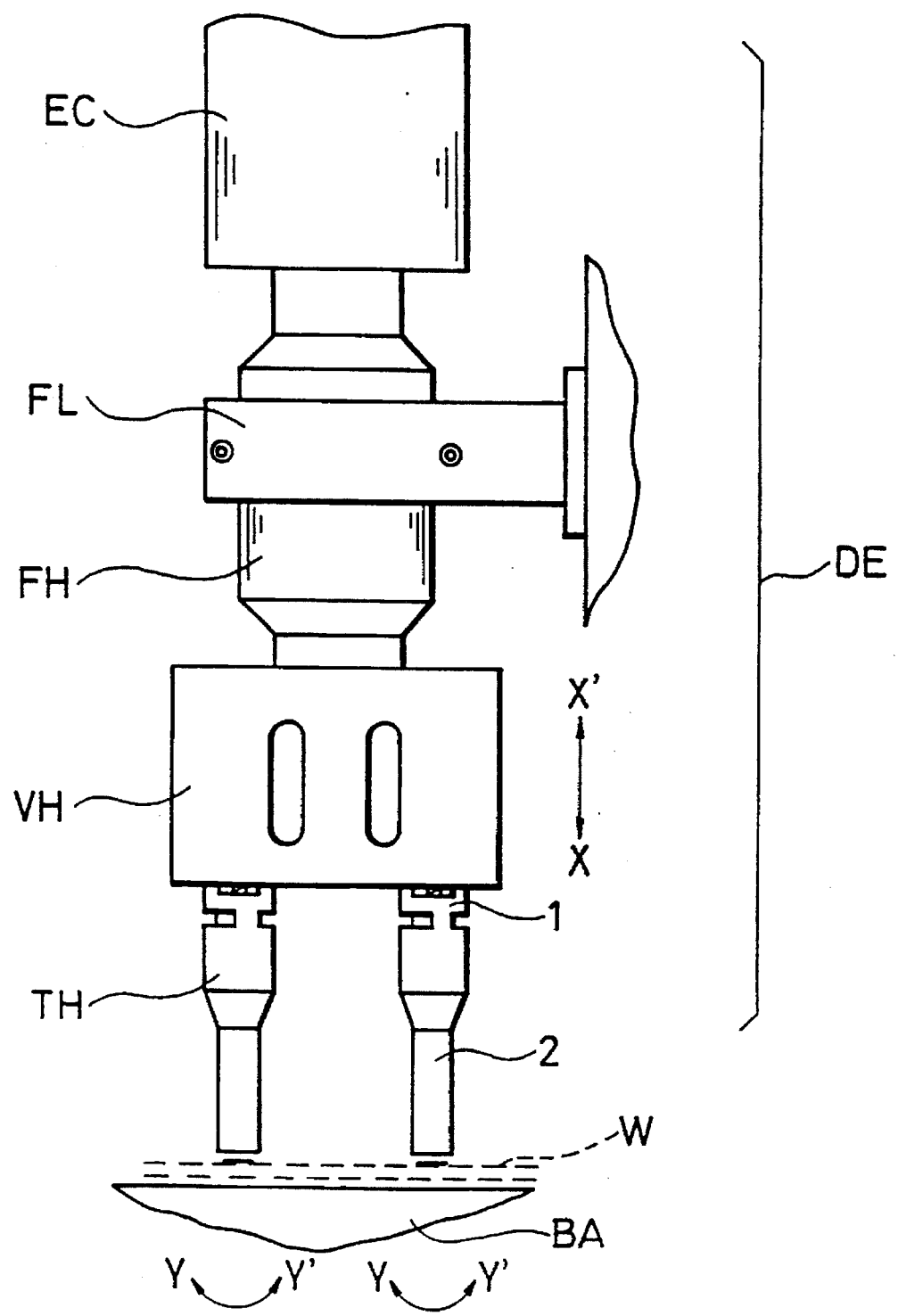
FIG. 3 is a side view showing the ultrasonic processing device fitted with the torsional vibration tool in FIG. 1.

The ultrasonic processing device (DE) in the present example is, as shown in FIG. 3, constituted in such a way that a fixed horn (FH) for adjusting amplitude carried on a supporting frame (FL) whose height is freely adjustable, is fitted not only with a longitudial vibration horn (VH) but also with a converter (EC), which can convert the electric signals delivered as an input to mechanical vibrations, and further, the lower edge of said longitudinal vibration horn (VH) is fitted with a torsional vibration horn (TH).

Figure 2A:
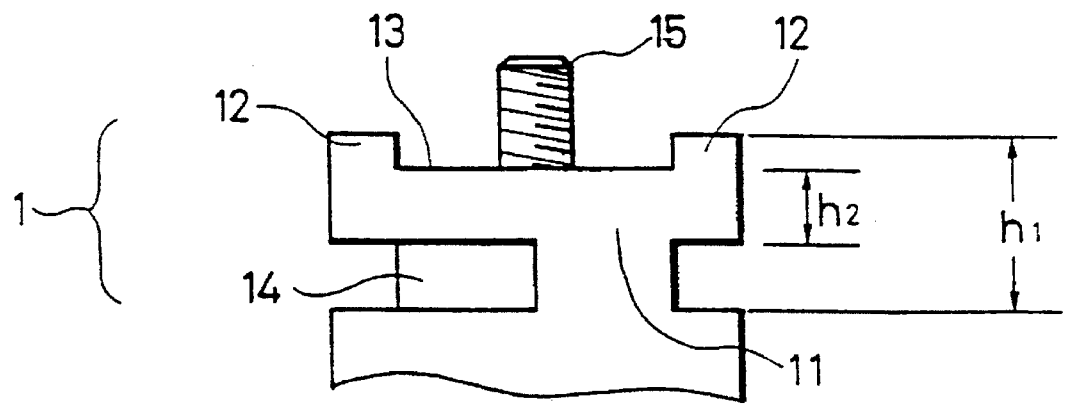
FIG. 2(A) is a side view showing one part of the vibration converting portion in FIG. 1.
Figure 2B:
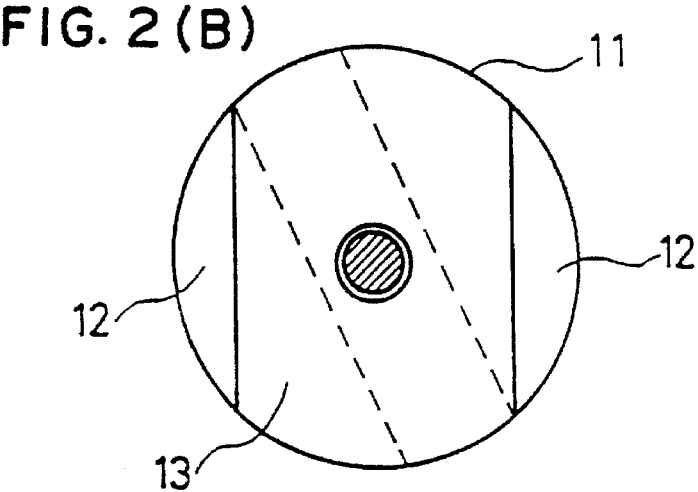
FIG. 2(B) is a cross-sectional view taken along (I)—(I) line of FIG. 1.
Figure 2C:
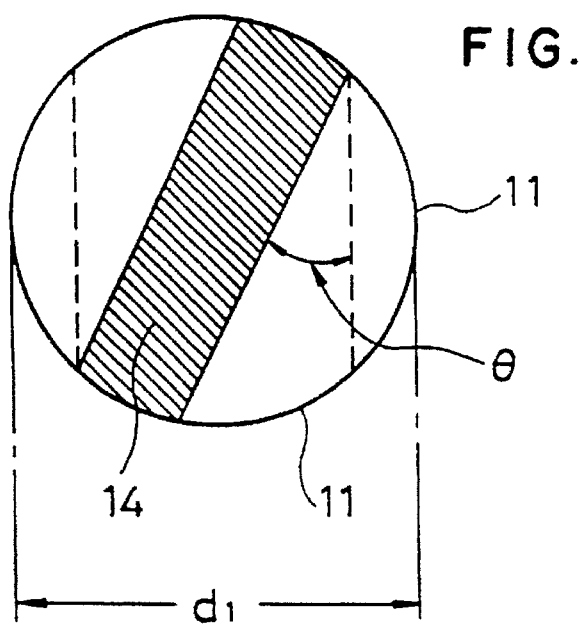
FIG. 2 (C) is a cross-sectional view taken along (II)—(II) line of FIG. 1.

Next, referring to the torsional vibration horn (TH), as shown in FIGS. 1 and 2, it is integrally formed into one unit of a vibration converting portion (1) and a torsional vibration tool portion (2), and said vibration .converting portion (1), which can convert longitudinal vibration input to torsional vibration output, is provided with a disk-shaped main body (11) whose upper surface is concaved to provide a grooved portion (13) in the central portion leaving one pair of projected frames (12) on both sides thereof, and the under surface is raised to provide a connecting rib (14), said projected frames (12) and said connecting rib (14) being in the form protrusively provided in such a relation as occupying the diagonal position to each other.

In additon, in said vibration converting portion (1) of the present example, as later described, satisfactory results of the vibration converting treatment can be obtained by making the equations related to the height ($h_1$), the thickness ($h_2$) and diameter ($d_1$) of the disk-shaped main body (11) to be $$h_1 = \frac{C_s}{4f_T} \tag{1}$$

wherein
$C_S$: sonic velocity of transverse wave
$f_T$: frequency of torsional vibration, and $$h_2 = \frac{2\pi f_B d_1^2}{0.289 \, mi^2 C} \tag{2}$$

wherein
$f_B$: frequency of flexural vibration
mi: vibration constant
C: sonic velocity of longitudinal wave,
and at the same time, taking the value of the angle (θ) made by the projected frames (12) and the connecting rib (14) to be $$\theta = \tan^{-1}\left(\frac{0.552 - \frac{h_2}{d_1}}{0.696}\right) \tag{3}$$

wherein
$h_2$: thickness of main body (11)
$d_1$: diameter of main body (11).

Further, the above-described torsional vibration tool (2), which is integrally connected with said connecting rib (14), is constituted so that the torsional vibrations may be generated on the undersurface thereof which has been made smaller in diameter.

Furthermore, the connecting structure of the above-described longitudinal vibration horn (VH) and the torsional vibration horn (TH), which is fitted at right angle thereto, is, as shown in FIG. 1, constructed in such a way that by making the projected frames (12) on the upper surface of the vibration converting portion (1) of the torsional vibration horn (TH) abut against the undersurface of the longitudinal vibration horn (VH) and at the same time, screwing the head portion of a set screw (15), which was protrusively provided in the central position of the grooved portion (13) so as not to be rotatable in the tapped hole (3), the torsional vibration horn (TH) is fitted at right angle to the longitudinal vibration horn (VH) as shown in FIG. 3, too.

Next, the state of use of this device (DE) will be explained.

Now, for example, a thermoplastic material being processed (W) is placed on a processing table (BA), and after the undersurface of the torsional vibration tool portion (2) has been made to abut against said material being processed by lowering the fixed horn (FH), by starting the fixed horn (FH) by an input from the converter (EC), ultrasonic vibrations concerned with longitudinal direction (in the direction of the arrow X–X') are induced in the longitudinal vibration horn (VH) connected with said fixed horn.

Then, the ultrasonic vibrations concerned with longitudinal direction in this longitudinal vibration horn (VH) are converted to torsional vibrations in the torsional direction (direction of the arrow Y–Y') by the torsional vibration horn (TH), generating in the torsional vibration tool portion (2) the ultrasonic vibrations which perform the ultrasonic welding of said material being processed (W).

In the above-described case, however, the principle of the conversion of the ultrasonic vibrations concerned with longitudinal direction to the torsional ultrasonic vibration is common to that of the above-described conventional example, in which "the torsional coupler" has been adopted. By the generation of the torsional vibrations in the disk-shaped main body (11) of the vibration converting portion (1) of the torsional vibration horn (TH) in the present example, the ultrasonic vibrations are subjected to conversion treatment in the same manner as in the conventional example. Such a point will be explained in more detail below.

That is to say, the frequency ($f_B$) of the flexural vibrations of the disk-shaped main body (11) in the case where longitudinal vibrations have been imparted to the vibration converting portion (1) as described above is as follows.

$$f_B = mi^2 \frac{RC}{2\pi d_1^2} \tag{4}$$

wherein
mi: vibration constant
R: form factor (0.289 $h_2$)
C: sonic velocity of longitudinal wave
$d_1$: diameter of main body (11).

Further, the frequently ($f_T$) of the torsional vibrations which were subjected to conversion treatment by the vibration converting portion (1) is as follows.

$$f_T = \frac{C_s}{4h_1} \tag{5}$$

wherein $C_s$: sonic velocity of transverse wave.

In addition, the sonic velocity of the transverse wave in the above case is expressed by $$C_s = \sqrt{\frac{G}{S}} \tag{6}$$

wherein
G: rigidity
S: density.

Consequently it has now been verified that the half-wavelength (L) of the torsional vibrations induced in the torsional vibration tool portion (2) is expressed by $$L = \frac{C_s}{2f_T} \quad (7)$$

wherein
$C_s$: sonic velocity of transverse wave
$f_T$: frequency of torsional vibration.

That is to say, in the present example, as the result that the flexure of flexural frequency ($f_B$) is generated in the disk-shaped main body (11), to which the longitudinal vibrations of sonic velocity (c) have been imparted, the torsional vibrations of half-wavelength (L) and of torsional frequency ($f_T$) at that are induced, making the torsional vibration tool portion (2) vibrate in the direction of the arrow (Y–Y'), so that the materials being processed on the processing table (BA) can be effectively subjected to ultrasonic processing.

POSSIBILITY OF INDUSTRIAL USE

As described above, in accordance with the present invention since the ultrasonic vibrations concerned with the longitudinal direction are efficiently converted to torsional vibrations in the vibration converting portion of a simple sutructure rendering it possible to drive the vibration tool portion by torsional vibration, the present invention can provide a compact and yet stout tool horn, and moreover, said tool horn can be Obtained as an excellent vibration tool which is adapted for welding, clamping, or insertion processing, etc. only by simply fitting it to an ultrasonic processing device equipped with a longitudinal vibration horn widely used for various purposes.

We claim:

1. A tool horn comprising an integrally formed structure including a vibration converter for converting longitudinal ultrasonic vibrations to torsional vibrations and a vibration tool for providing torsional vibrations to a workpiece, said vibration converter including an elongated metal bar having first and second longitudinal sides arranged opposite to each other, said first longitudinal side receiving said longitudinal vibrations and said second longitudinal side providing said torsional vibrations to said vibration tool.

2. The tool horn of claim 1, wherein said vibration converter includes a disc having a pair of projections at opposing ends thereof for attachment to a longitudinal vibration horn, said projections extending in a direction perpendicular to a plane passing through said disc.

3. The tool horn of claim 1, wherein said vibration converter includes a disc and said elongated bar is arranged on a first side of said disc and a pair of projections are arranged on a second side of said disc, said projections respectively have one curved edge coincident with an edge of said disc and a straight edge extending in a direction transverse to an axis of said disc, and said elongated bar extends diagonally through said axis of said disc within a range Corresponding to said straight edges.

4. The tool horn of claim 3, wherein said elongated bar and said straight edge of a respective said projection are arranged at an angle θ as defined below and said vibration converter has a structure satisfying relationships (1), (2) and (3) as follows:

$$h_1 = \frac{C_s}{4f_T}, \quad (1)$$

$$h_2 = \frac{2\pi f_B d_1^2}{0.289 m i^2 C}, \quad (2)$$

and $$\theta = \tan^{-1}\left(\frac{0.552 - \frac{h_2}{d_1}}{0.696}\right) \quad (3)$$

wherein:

$h_1$ is combined height of said disc, said projections, and said elongated bar, $h_2$ is thickness of said disc, $d_1$ is diameter of said disc, $C_S$ is sonic velocity of transverse wave, $f_T$ is frequency of torsional vibration, $f_B$ is frequency of flexural vibration, mi is a vibration constant, and C is sonic velocity of longitudinal wave.

5. A horn for transmitting ultrasonic vibrations adapted for receiving longitudinal vibrations and providing torsional vibrations in the sonic or ultrasonic frequency range comprising:

an elongated metal bar having at one end a radially disposed input surface for receiving thereat longitudinal ultrasonic vibrations and having at an opposite end a radially disposed output surface for providing torsional vibrations to a workpiece coupled thereto, and said bar including as an integral part thereof a converting portion configured for converting longitudinal ultrasonic vibrations received at said input surface to torsional vibrations manifest at said output surface.

* * * * *